United States Patent Office 3,814,791
Patented June 4, 1974

3,814,791
METHOD OF PREPARING PILE SURFACED PRODUCTS FROM EPOXY RESIN
Michael Edward Benet Jones, Runcorn, England, assignor to Imperial Chemical Industries Limited, London, England
Filed Apr. 21, 1972, Ser. No. 246,251
Claims priority, application Great Britain, June 16, 1971, 28,206/71
Int. Cl. B29c 17/02; B32b 5/00
U.S. Cl. 264—164                      8 Claims

ABSTRACT OF THE DISCLOSURE

A method of preparing pile surfaced products which comprises contacting with a surface to which it adheres a curable epoxy resin of which the uncured state has between 2.0 and 0.2 gram equivalents of epoxide groups per kilogram of resin, separating the resin from the surface at a point at which it is capable of fibrillation, so that fibres are formed in the resin, effecting cure of the fibres to stabilize them, and detaching the resin and its adherent fibres from the said surface.

---

This invention relates to products comprising polymeric materials and to methods of preparing such products.

It has been suggested to soften a sheet of thermoplastic polymeric material (that is, material which can be softened repeatedly merely by heating it, without significant decomposition taking place) by heating it, to press the heat softened material against a surface, to separate it from the surface so that strands of molten polymer form between the surface and the mass of the polymer, and subsequently to blow cold air onto the strands so that they cool, harden and break away from the surface.

The present invention provides a method of producing a pile-surfaced product in which the final polymerization of a polymeric material occurs after the pile has been produced.

The invention provides a product having a pile surface comprising a plurality of fibres or tufts of fibres attached at one or both ends to a foundation, said fibres or tufts comprising polymeric material. In the context of this specification fibres are filaments of length greater than their average diameter, usually of length at least five times their average diameter; and tufts comprise a plurality of fibres which may merely be in juxtaposition or may be conjoined with each other along at least a proportion of their length. Not infrequently a plurality of fibres may be joined side by side to form a row, usually of thickness of the order of one fibre diameter and of a length which, of course, can vary widely. Preferably the fibres will be from 0.5–20 mm. long, and from 0.01–2 mm. thick. As used hereinafter, unless the contrary is apparent, the word "fibre" includes tufts of fibres and pile surface includes surfaces comprising tufts of fibres.

According to another aspect of the invention there is provided a method of preparing a pile-surfaced product which method comprises contacting a polymeric material in an incompletely polymerized state with a surface to which it adheres, separating the surface from the bulk of the polymer whereby fibres are drawn between the bulk of the polymer and the surface, hardening the polymeric material at least to a degree at which the fibres will not collapse into the bulk of the polymeric material when separated from the surface, and parting the fibres from the surface. Where generally used in this specification "polymer" includes both incompletely and completely cured polymer; it will be apparent from the context which state of cure is contemplated.

The pile surfaced product of the invention may comprise a foundation component upon which the pile surface is formed, or the material of the product may be integral with the pile, that is, pile and the foundation to which it is attached may be of the same material. The product may be rigid or it may be a flexible sheet or membrane which may be continuous (i.e. non-porous), porous or perforated. The polymeric material composing the pile may adhere to the foundation component and/or may penetrate it. The foundation may, as mentioned above, comprise a polymeric material, and it may be a laminate comprising two or more components one or more components of which may be of polymeric material.

Preferred foundations for the products of the invention are porous or perforated sheets or webs. These may be of any suitable material, for example woven or unwoven textile webs, and webs comprising metals, and naturally occurring or synthetic polymeric materials. Obviously the foundation will comprise materials which are not adversely affected by the processing conditions to which they are exposed during preparation of the pile-surfaced product. In particular, where heat is employed in the process of the invention the foundation is preferably not softened at the temperature employed. It is generally preferred to use a woven textile as the foundation; thus, we have obtained satisfactory results with hessian, cotton net, glass fibre scrim, linen scrim and the like. The web may also be of paper or other material, e.g. metal or cardboard, having holes formed, e.g. punched, in it. It may also be expanded optionally metal or expanded plastic, or extruded plastic net. Plastic foam sheeting (of thermoplastic or of thermosetting resin) has been pile-surfaced using the process of the invention, particularly open-celled relatively thin (1–10 mm. thick) elastic foam. Bonded unwoven, or unbonded unwoven, webs can be used, although care may be needed in at the fibre forming stage in the latter case, at least until the pile material has hardened sufficiently to act as an effective bonding agent for the fibres of the foundation. Alternatively bonding of the textile fibres may be by means of a separate bonding agent which may be, for example, a polymer different from that used in the formation of the pile-surface. Pile-surfaces have also been produced on hard and on resilient foundation materials, e.g. relatively solid slightly resilient rubber, and upon a rigid metal sheet.

The polymeric material employed to form the pile according to the invention is one which, during the course of polymerization, exists in a state in which it may form a liquid or a cohesive but flexible film, and in which state the material has "tack"—that is, the property of adhering to a suitable surface and, upon the bulk of the polymer being withdrawn from the surface, of "stringing" to form a plurality of fibres extending between the bulk of the polymer and the surface, and subsequently of hardening to a degree such that at least the fibres so formed, on breaking from the surface, do not collapse into the bulk of the polymer.

Curable polymers constitute a very wide range of materials and selection of an appropriate composition can be determined by simple test to be described below. As examples of curable materials which may be employed according to the invention we may mention vinyl compounds, epoxides, polyesters, including poly(ethylene terephthalate) and polycarbonates, polyamides, polyurethanes and the formaldehyde resins, e.g. phenolformaldehyde, urea-formaldehyde and melamine-formaldehyde resins.

A wide range of curing techniques are known and these are adequately discussed in the literature in relation to each of the materials exemplified. Thus, where appropriate there may be employed curing techniques involving heat, radiation (including U.V.) or chemical cure. Treatments involving molecular rearrangement may be employed where appropriate, for example dehydration, cyclization, etc. Again such techniques are further discussed below.

Since the principle of the invention is simple, and the requirements of polymeric materials which may be employed in it are so clearly defined, selection of an appropriate material can be made from a knowledge of its properties and mode of preparation, together with the results of a simple practical test such as that set out below:

The material in a suitably tacky form, which may be in solution or molten, is enclosed, as a thin film of the order of 1 mm. thick, between two rigid plates surfaced on the faces in contact with the polymer with the material, on the one plate of the foundation to which the pile is to adhere permanently and, on the other, the material to which the tacky polymer is to adhere temporarily while the pile is being drawn. (This latter surface may conveniently be referred to as the "temporary anchorage.") The plates are then drawn apart in a direction perpendicular to the plane of the film of polymer and are held apart at a distance of the order of 2.5 cm. while cure continues until sufficient hardening to prevent collapse of any fibres formed has occurred.

This simple test may easily be repeated both to determine which particular polymer compositions are most amenable to processing to form a pile according to the invention, and then to determine approximately optimum processing conditions, for example, the appropriate concentration or dosage of cure initiator and the various time periods which may be required, for example for cure to adequate tack, hardening to noncollapsibility, and final hardening to the point at which separation from the "temporary anchorage" occurs with minimum undesirable deformation of the fibres. Such conditions can be carried out relatively quickly by the skilled man and involve only routine testing procedures.

Figure 1:
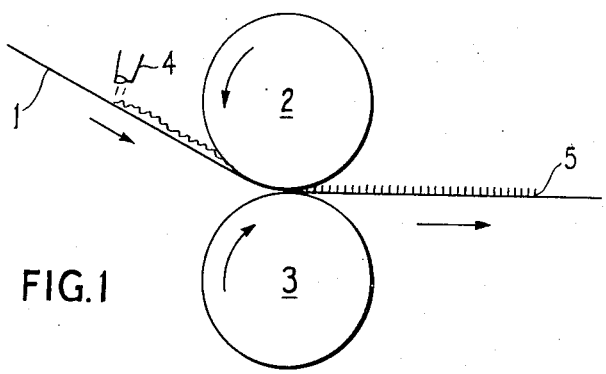
FIG. 1 is a schematic elevational view of apparatus for carrying out the method of the invention.

FIG. 1 shows diagrammatically, in side elevation, one form of apparatus in which a foundation e.g. a web or sheet of material 1 to the surface of which polymeric pile is to be applied is fed into the nip of a pair of contra-rotating rolls 2 and 3 rotating in the direction of the arrows. The polymeric material 4 is applied to the surface of the foundation and as the foundation emerges from the exit nip a pile is pulled between the foundation and the surface of roll 2, which provides the "temporary anchorage" referred to above. After hardening, the pile separates from the "temporary anchorage" as a result of the tension of the foundation, assisted, optionally by mechanical agitation e.g. by impinging a stream of fluid on to the fibres, the resulting pile-surfaced product proceeding to subsequent treatment stations as desired. The sequence at the exit nip is shown in greater detail in FIG. 2 in which the polymer is shown emerging from the nip at A in a tacky state and adhering to the foundation sheet 1 and to the surface of roll 2. As the distance between the foundation and roll surfaces progressively increases "stringing" of the polymer occurs (stage BC) during which cure hardening of the polymer is also being effected in a manner appropriate to the material. At C the hardness of the material is such that further extension does not occur, and the tips of the fibres 6 separate from the roll surface leaving the pile on the surface of the foundation. There may be some collapse of the fibres following separation from the drum surface but the hardening rate of the polymer and the processing conditions chosen will be such that complete collapse of the fibres back into the polymer mass does not occur.

While this embodiment of the invention has been illustrated with reference to apparatus employing two rolls, it will be appreciated that for continuous production of the pile-surfaced product all that is required is a surface corresponding to that of drum 2 which is capable of moving at the speed and in the direction that it is desired to move the foundation, and of a form such that it can be held in contact with the layer of polymer and subsequently progressively separated from it to produce the fibres, both of these stages being of a duration appropriate to the particular polymer then being employed. Thus, the drum 2 may be replaced by, for example, an endless belt. Similarly roll 3 may be replaced by any appropriate means capable of supporting the foundation in the desired position, and while it, similarly, may be an endless belt, it may also be stationary if the surface of the foundation contacting it is sufficiently smooth to slide over it without undue friction. For example, where there is no likelihood of any adhesion or excessive friction developing between the reverse side of the foundation and the support surface, the support may comprise a stationary plate which advantageously may be surfaced with a "non-stick" material e.g. a silicone or fluorinated hydrocarbon.

Figure 3:
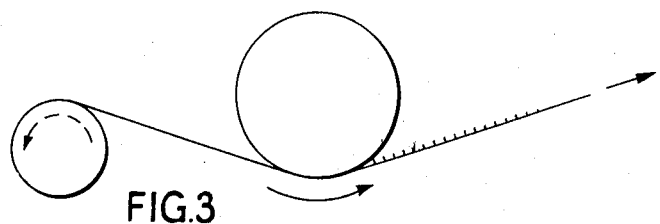
FIGS. 3, 4 and 5 are schematic elevational views of three additional forms of apparatus for carrying out the method.

Again, by applying tension or support to the foundation so that it is held in the appropriate position relative to the "temporary anchorage" during the pile drawing phase of the process the use of a separate support surface in the immediate vicinity of the "temporary anchorage" surface may be obviated completely. FIG. 3 illustrates apparatus according to this embodiment, tension being applied to the ends of the foundation, which in this instance is represented as a flexible sheet of appropriate tensile strength.

The "temporary anchorage" surface represented in FIG. 1 by the surface of drum 2 may be of metal, but it may be advantageous to use other materials, particularly where components of the polymeric material being treated may attack the surface. Selection of an appropriate surface material will obviously be made in this light. The surface may, for example, be of stoneware, ceramic, concrete or glass. It may be smooth (optionally non-stick e.g. PTFE surface) but the use of surfaces that have been roughened is not excluded e.g. by abrasion, etching, grinding, shotblasting or knurling.

The foundation and the polymeric material may be held and preferably pressed into contact with the "temporary anchorage" surface by resilient means.

By resilient in the context of this specification we mean that the surface is not hard and unyielding as is the case, for example if a steel surfaced roll is employed. Materials having a wide range of resilience may be employed and up to a Shore Hardness of 20, 40 or even 70 as measured on a Shore Durometer Type A2 (ASTM D676). A minimum hardness is one consistent with the ability to hold the web against the polymeric material and the "temporary anchorage" surface sufficiently for the performance of the invention. The resilient material preferably is one having a minimum value of 8 in which 8 is the load in pounds required to produce an indentation of 0.25 inch in a sheet of the material 1" thick when the material is placed between two square plates each 50 sq. in. in area (see ASTM D15464–64). We have found that a minimum thickness of about 1 mm., preferably 2–6 mm. is desirable, although the thickness may be increased, with advantage, particularly when harder resilient materials are employed. Examples of resilient materials, which in use should be chosen with regard to their ability to withstand the operating conditions, include silicone rubbers, neoprene rubbers, and polyurethane foams. Closed-cell foams are preferred. Cork and leather may be mentioned as examples of naturally occurring resilient materials which may find application in this context.

Figure 5:
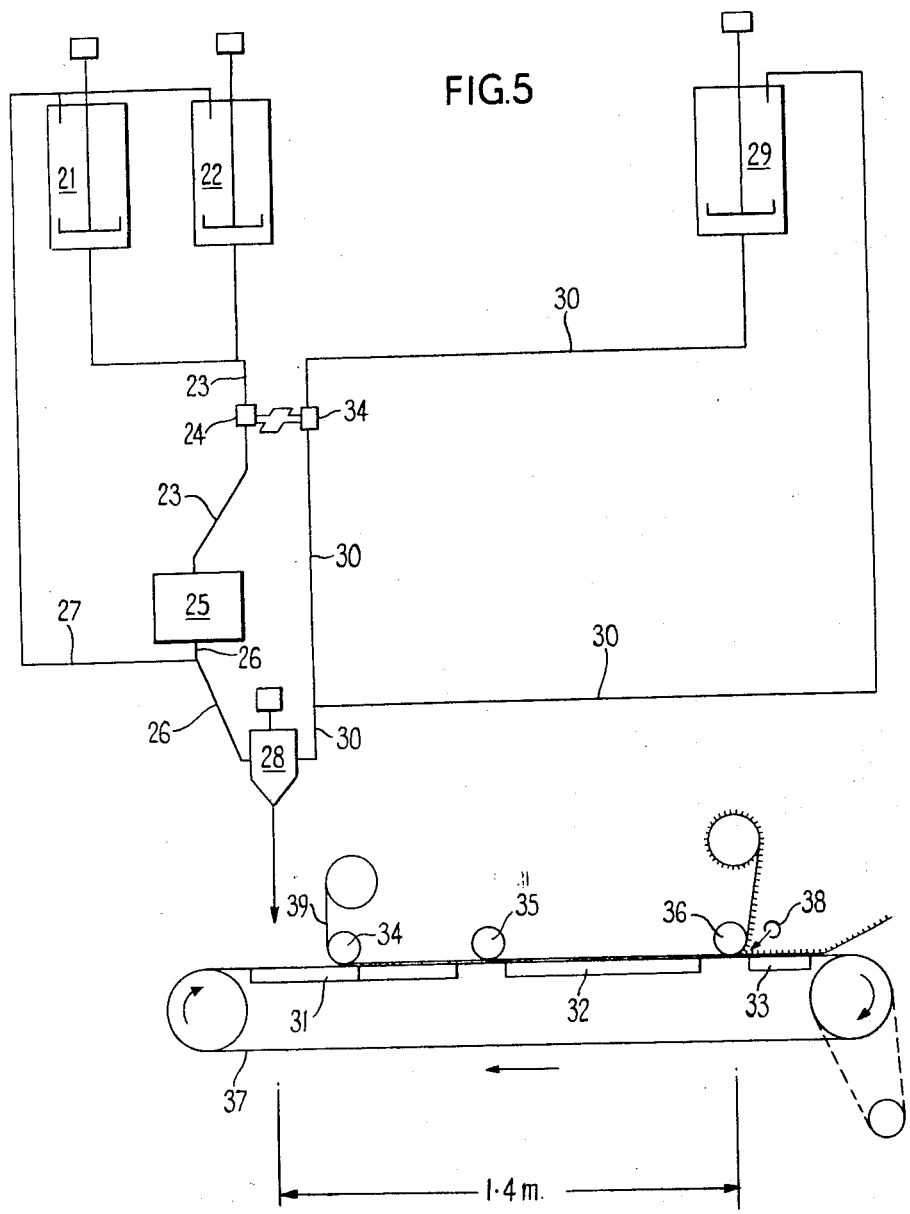

In an alternative embodiment, as illustrated diagrammatically in side elevation in FIG. 5, a product may be obtained by interposing the incompletely cured polymeric material between two surfaces to which it adheres so that as they are separated, when the polymer is in the tacky state, fibers of polymer form between two layers of the polymer, one adhered to each surface. When the surfaces are separated further, so that the fibres break, two sheets of the product are obtained, one adhering to each of said surfaces. The surfaces employed conveniently are of foundation material such as hereinbefore described, but we have also found that if one or both of the surfaces are relatively non-adhesive to the product after further hardening of the polymer, then the product may be stripped from the surface to give a pile-surfaced sheet, which is often porous and "breathable" depending upon its thickness. Such porous products are particularly valuable, for example as components of articles to be worn.

Figure 2:
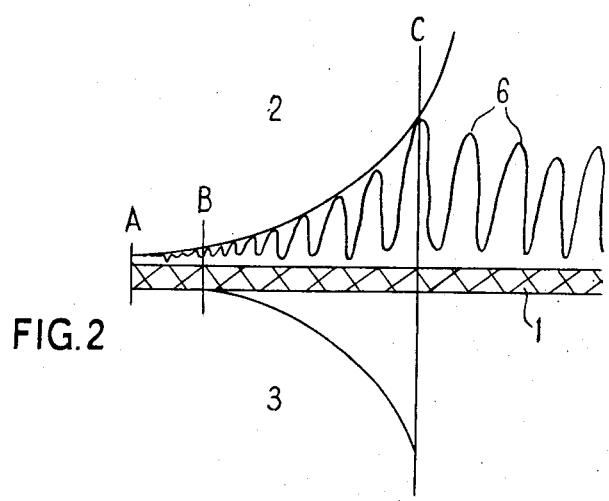
FIG. 2 is a fragmentary view on an enlarged scale illustrating the formation of fibres by the apparatus of FIG. 1.

Apparatus as illustrated in FIGS. 1 to 3 is particularly suitable for the use of polymeric materials which undergo a controllable curing phase during which they proceed through the tacky stage at which they are sufficiently adhesive to an appropriate "temporary anchorage" surface to enable fibres to be drawn, and subsequently harden and become relatively easily separated from the "temporary anchorage."

Polymeric materials for use according to the invention may be selected from systems in which cure rate is sufficiently increased by heating to enable the process to be effected at an appropriately fast rate at elevated temperatures but which have a relatively long uncured life at ambient temperatures after mixing of any curing agents so that timing is not unduly critical. Many such polymer systems may find application in the present invention, including for example, rubbers containing cross-linking agents (these are frequently applicable when they pass through a tacky thermoplastic stage before vulcanization to the thermoset stage hardens them irreversibly). Again the selection of the thermosetting system will present no difficulty to the skilled man, since the properties of such systems are well known, including the effect upon cure time of catalysts and temperature.

While a process involving in-situ polymerization directly from the monomer to the polymerized product constituting a pile is not excluded it is preferred to employ a system which is essentially a polymerization completion, that is, the material fed into the nip in, say, FIG. 1 is a low or relatively high molecular weight polymer in a state in which fibrils may be drawn from it as mentioned earlier, and which may undergo further polymerization during the process to a point at which it has the properties indicated above as being appropriate.

Many of the polymer classes provide compositions which are suitable for use according to the invention, that is which, by careful selection of curing conditions, will proceed through a viscous phase to a more fully cured, harder tack-free product.

Polyurethanes are a preferred class of compounds for use according to the invention, since their properties can be so widely modified in known manner.

The isocyanates used include the so-called "crude" isocyanates; and polyurethane compositions which are particularly suitable for the purposes of the invention are those usually employed in the production of polyurethane elastomers, although foam forming compositions can be used.

Unsaturated polyester resin compositions also are convenient materials for use according to the invention, since cure rate after addition of the catalyst/accelerator combination to the typical resin/unsaturated cross-linking agent, e.g. styrene mixture usually employed is sufficiently controllable for the purposes of the invention.

Phenol-formaldehyde resins may be employed, employing either novolacs or resol routes; the aminoplastic systems similarly are applicable to the invention, particularly urea- and melamine formaldehyde. In use the phenol, urea, or melamine formaldehyde is employed as the syrup, cure during the process being effected in an appropriate known manner for the particular material e.g. novolac/TMTA, resol/acid, UF/acid, MF/acid.

Natural and synthetic rubbers, compounded with a suitable vulcanizing (cross linking) agent may be fed in the incompletely crosslinked (thermoplastic) state to the nip, heat being applied to effect polymerization at an appropriate rate to the desired hardness. Epoxy resins (prepared by reaction of epichlorhydrin and a polyhydric phenol) may be cross-linked in a controlled manner by reaction with, for example, amines and phenols.

The silicone-based plastics are heat-curing in the presence of catalysts such as zinc octoate, and they may be copolymerized for example with alkyd resins. Vinyl silanes (polymerized through the vinyl group) are other silicon-containing polymers.

Styrene, either part- or un-polymerized may be polymerized, for example using a peroxide catalyst at high temperature (about 100° C.). Copolymerization of styrene with comonomers, e.g. acrylonitrile, is a well-known technique. Radiation (U.V.) cure of styrene may also be employed, particularly in the presence of a U.V. degradable free-radical generator. Similarly free radical initiation may be employed to initiate copolymerization of styrene and maleic anhydride. Other systems involving styrene, and their various properties which will enable an appropriate selection to be made for the purposes of the invention, are fully described in the literature.

Monomers which may be employed according to the invention are exemplified by the following. Precise reaction conditions required will be apparent to the skilled man. Vinyl monomers, including styrene, acrylates, methacrylate, vinyl esters, and copolymers of these with other monomers and with each other (e.g. glycerol dimethacrylate may advantageously be copolymerized with, say, lauryl methacrylate, the properties of a homopolymer of which might not be so useful as pile product) may be catalyzed by a variety of systems, as appropriate; for example, by very mild cationic polymerization, free radical polymerization (e.g. using boron alkyl/$O_2$, metal carbonyl/halide, metal complex/halide systems), anionic polymerization (e.g. using BuLi, sodamide sodionaphthalene etc.) electron transfer polymerization (e.g. N-vinyl indole, N-vinyl pyrole, N-vinylcarbazole and 1,1 diethoxyethylene may be catalyzed with catalytic amounts of electron acceptors such as tetracyanoethylene, chloranil, maleic anhydride, acrylic esters or acrylonitrile), and radiation (U.V.) polymerization. Spontaneous polymerization of suitable mixtures of monomers may also occur, e.g. vinylidene cyanide/vinyl ethers in presence of a diluent to restrain the reaction and trinitrostyrene/4-vinylpyridine or 4-dimethaminostyrene.

Cyclic monomers may also be applicable to the process of the invention, e.g. cyclic ethers—especially 1,2-epoxides (e.g. polyepoxides (e.g. Epikote 828) and, although probably less ueful unless used as a comonomer, monoepoxides). Both acid and base catalysts may be employed e.g. 2,4,6 - tris - (dimethylaminomethyl) - phenol (DMP 30) and some amine salts, especially some iminazole salts. Acid catalysts include protonic acids Friedel-Crafts halides, particularly such as may be generated from precursors e.g. by heat. Oxetanes, e.g. 3,3-bis-(chlormethyl) oxetane may be employed, especially in solution using a Friedel-Crafts catalyst and at low temperatures. Aluminium alkyl and aluminium alkoxy catalysts may be employed as catalysts with oxetanes. Of cyclic ester monomers, mention may be made of β-lactones, e.g. pivalolactone especially using catalysts chosen to give good melt stability e.g. quaternary ammonium salts, phosphonium salts and triphenyl phosphine. Higher lactones may polymerize to viscous melts e.g. δ-valerolactone and E-caprolactone using aluminium alkoxide catalysts. Other cyclic esters include diglycollide and lactide which may polymerize to give high-melting polyglycollide or a lower melting polylactide of cyclic amides, caprolactam or even simple polymerization of unpromoted sodiocaprolactam, may be employed. The polymerization of β-lactams has been detailed in the literature.

Copolymers are often preferred in the process of the invention, since the use thereof enables selection from a wide variety of properties to be made. Thus, many direactive monomers may be so employed, including dienes, diepoxides, unsaturated epoxides, dinitriles and diisocyanates of appropriate chain length.

Polycyanic esters may be polymerized using acid (protonic or Lewis) or base catalysts. Of polycyanamides we may mention the low melting polymethylene dicyanamides e.g. hexamethylene or dodecamethylene dicyanamides (these melt at 62° C. and 81° C. respectively and rapidly polymerize to viscous syrups).

Low molecular weight polymers, particularly ethylene copolymers with e.g. hydroxyethyl methacrylate, glycol monovinyl ethers, vinyl acetate, carbon monoxide, vinyl isocyanate and glycidyl methacrylate may be employed. Such low molecular weight compounds usually have an average molecular weight of the order of 500–5000, preferably 1000–3000. Other examples are liquid polyallyl glycidyl ether (polymerized through the allyl group) and liquid polybutadiene reaction products, e.g. epoxidized to "Oxiron" resins or to a polyisocyanate by reaction with HCNO. Liquid mercapto-ended polysulphides such as are used commercially in epoxide curing, may be converted to diisocyanate prepolymers, and β-lactone ended derivatives may be prepared by reaction with diketene.

Polyaddition systems comprising, in admixture with polyamines, polylactones, polyfunctional cyclic carbonates, acyl lactams, acyl imides, diisopropenyl esters, polyacrylic esters, polydiketenes, bis-thialactones, bis-vinyl sulphones, bis-ketenes and bis-(methoxymethyl) aromatics, bis-oxazolines, bis-acylurethanes, polycyanic esters, glycidic esters may be employed according to the invention. Other polyaddition systems will suggest themselves to the skilled man, including polyoxethanes and polycarboxylic acids or anhydrides, Diels-Alder polyadditions, bis-carbiimide polyaddition products, bis-azlactones and active hydrogen compounds.

It will be apparent from the foregoing that a wide range of cure mechanisms are envisaged in the process of the invention; spontaneous cure following admixture of reactants; heat cure, including for example thermocyclic dehydration reactions which may be carried out at temperatures up to about 500° C. if the other components of the system, equipment etc. will tolerate such temperatures cure initiated by acids, bases, free radicals (including compounds capable of generating these), etc.; radiation curing, including both infrared and ultraviolet radiation. Modification of the apparatus described above where necessary to accommodate such cure systems may be effected in the light of current knowledge. Thus, spray techniques, involving the spraying of a curing agent on to the incompletely cured polymer or monomer mass may involve the use of, say, a perforated backing surface through which the curing agent may pass. Again, radiation cure may necessitate, for example, the use of processing equipment transparent where appropriate to the radiation employed; e.g. a drum employed as shown in FIG. 1 as the "temporary anchorage" may be of material transparent to U.V. so that radiation of the curing polymer may continue while it is in contact with the drum surface, a suitable U.V. radiator being disposed within the drum. Such modifications as are apparent from the foregoing and from the literature will present no difficulty to the skilled man.

The invention is illustrated by the following examples.

EXAMPLE 1

Figure 4:
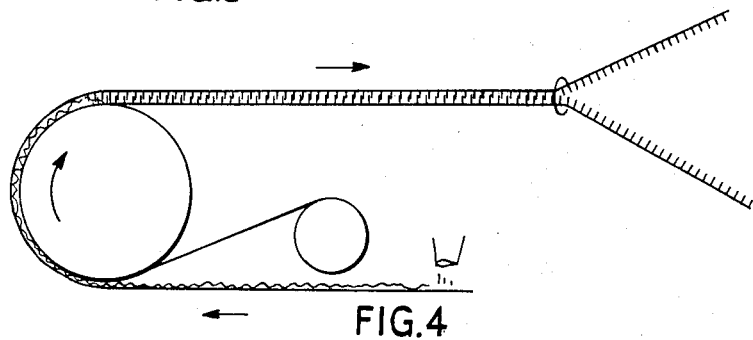

An uncross-linked styrene/butadiene rubber was fed into the nip of apparatus as shown in FIG. 4, the extended contact surface, compared with that used in FIG. 1, being employed in view of the known cross-linking time required for the composition being used. No backing surface was employed, tension being applied at both ends of the webs to maintain contact with the drum surface.

The thermoplastic rubber, which was of putty-like consistency, was fed into the nip as a sheet 4 mm. thick between two webs of thin cloth (1 mm. thick). The drum surface was heated to 150° C. by internally disposed radiant heaters and contact with the drum was maintained for 5½ minutes (a period determined by means of the simple plate separation test described earlier). The two layers of cloth were then progressively separated and were held at an appropriate distance apart while the rubber hardened until it would break to give two surfaces, as shown, which were covered with lines of fibrils which adhered for at least a proportion of their length.

The final hardening period could be shortened and the form of the surface obtained altered somewhat by feeding a hot gas, for example super heated steam, onto the fibrils as they form.

In this example, of course, the surface of the drum is not employed as a "temporary anchorage." This being provided by the web adjacent the drum, to which, however, a residue of polymer adheres. This technique is clearly of value when clean separation of the polymer form a "temporary anchorage" cannot be attained.

EXAMPLE 2

Apparatus as illustrated in FIG. 6 was employed as follows:

A polyurethane prepolymer was prepared from polypropylene glycol (M.W. 2000) and M.D.I. (4,4'-diisocyanate diphenyl methane) in the molar ratio 1:4:3. This gave a prepolymer analyzing at 8.73% isocyanate determined as follows: a known weight of a sample of the prepolymer was dissolved in 50 ml. acetone and added to 50 ml. of a reagent consisting of 25 pts. of di-n-butylamine in 770 pts. of toluene. The mixture was then added to 100 ml. of isopropanol containing Bromocresol green as indicator. Titration was against N/10HCl to yellow end point. The process was repeated without the sample for blank titre.

$$\text{Percent NCO} = \frac{0.42 \times (\text{Blank} - \text{titre})}{\text{Wt. of sample}}$$

The resulting prepolymer was mixed with 1,4-butane diol to an overall OH/NCO ratio of 1/1.07.

Referring now to the figure 21 and 22 are prepolymer hold vessels, tape heated, with stirring, held at 60° C.; 23, 26 and 27 are prepolymer delivery and recycle pipelines, tape heated to 63° C.

24 is the prepolymer metering pump, block heated to 63° C.

25 is the propolymer heat exchanger coil, maintained at 63° C.

29 is the diol hold vessel, tape heated, with stirring, held at 90° C.

30 is diol metering pump, tape heated to 90° C.

34 is the diol metering pump, tape heated to 90° C.

28 is a Smear mixing head, band heated to 130° C., the polymer mix being at 112° C.

31 is a curing plate at temperature 150° C.

32 is a curing plate at temperature 120° C.

33 is a water cooled plate—10° C.

Pressure rolls 34, 35 and 36 are free-running stainless steel rollers.

Curing belt 37 is P.T.F.E. coated glass cloth. Speed 1.44 ft./min.

38 is an air-blast from the low pressure air supply. The polymer was delivered to form a layer 1.5 mm. thick.

Web 39 was of kraft paper, and the surface pile obtained with the distances and conditions indicated was short and reminiscent of suede. The polymer adhering to the belt was peeled away as shown and had a similar pile to the other, but the product was porous.

The air blast was delivered to the outgoing nip of the apparatus through a tube with its axis across the width of the web and provided with a slot and adjusting means whereby the direction of impingement of the air on the polymer could be accurately adjusted. The use of a jet of cold air in this fashion is found to be advantageous, particularly with polyurethane polymers, since it appears to reduce the tendency of the newly formed fibres to collapse on separation. Low pressure air is preferred since if it is excessive the fibres tend to be dislodged from the webs.

EXAMPLE 3

The process of Example 2 was repeated using apparatus and materials generally similar to that of Example 2, except that two webs were used, whereby two sheets of pile surface product were obtained, each adhering to a sheet of the web.

EXAMPLE 4

In a further experiment, the polymer composition was varied so that the prepolymer isocyanate analysis was 12.11% and OH/NCO ratio 1/1.05. This resulted in a more rapid cure which necessitated a shorter contact time (about 14″) than previously, and a faster belt speed—2.1 ft./min.

EXAMPLE 5

The effect of temperature on the fibrillation point (i.e. time of separation to form fibrils) is illustrated by the following experiment in which a phenol-formaldehyde composition, catalyzed by 1.25% by wt. of a mixture of 80 pts. by weight of glycerol and 20 pts. by weight of 36% hydrochloric acid.

| Slide temperature, °C.: | Time (secs.) |
|---|---|
| 150 | <5 |
| 120 | 5–10 |
| 100 | 15–20 |
| 80 | 60–90 |

EXAMPLE 6

A variety of polyurethane systems were tested to illustrate the differing properties of the resulting fibrils.

| Formulation | Molar ratio PEA(2000)/MDI | Result |
|---|---|---|
| MDI/PEA/butane diol | 1:7.3 | Fibrillated at 160° C., tough fibrils. |
| Do | 1:6.3 | Fibrillated at 160° C. soften fibrils. |
| Do | 1:5.3 | Fibrillated at 160° C., elastic fibrils. |
| Do | 1:4.3 | Fibrillated at 160° C., very elastic fibrils. |
| Highly branched component from Suprasec DN/DEG/AA/TPA/G. | NCO:OH=1.0 | Relatively brittle fibrils. |
| OPG 300/MDI | NCO:OH=1.0 | Family brittle fibres. |
| OPG 400/MDI | NCO:OH=1.0 | Do. |
| DEG/AA/TMP/MDI | NCO:OH=1.0 | Do. |
| OPG/TDA/MDI | NCO:OH=1.0 | Do. |
| OPTDA/MDI | NCO:OH=1.0 | Do. |

ABBREVIATIONS: MDI = diphenyl methane diisocyanate; OPG = oxypropylated glycerol; DEG = diethylene glycol; AA = adipic acid; TMP = timethylol propane; TDA = toluene diamine; DPTDA = oxypropylated toluene diamine; PEA = polyethylene adipate; G = glycerol; HEM = hydroxyethyl methacrylate.

EXAMPLE 7

"One pack" polyurethane systems, stable at room temperature but reactive at higher temperatures, were prepared using solid diols dispersed in isocyanate prepolymers. These systems were stable for a few hours at room temperature but reacted rapidly when heated to a temperature above the diol melting point.

| Diol (moles) | M.P., °C. | Prepolymer | Product |
|---|---|---|---|
| Benzene dimethanol-1 | 121 | PEA/2MDI | Fibrillated at 200° C., soft elastomeric fibrils. |
| Cyclohexane diol-1 | 120 | PEA/3MDI | Fibrillated at 200° C., elastomeric fibrils. |
| Cyclohexane diol-2 | 120 | PEA/3MDI | Fibrillated at 200° C., tough fibrils. |
| MDI/2EG-2 | 150 | PEA/3MDI | Fibrillates only when kept homogeneous at 7,200° C. |

EXAMPLE 8

Vinyl polymerization was illustrated using styrene polymers.

(a) Stannic chloride catalyzed styrene at room temperature polymerized rapidly and could be fibrillated after 3 to 5 minutes. The use of a cool air blast as described in Example 2 was beneficial in inducing fibre stability.

(b) Similar results were obtained using t-butylhydroperoxide as the catalyst, although the reaction time was much longer. Fibrillation occurred successfully at 100–150° C.

(c) Methylmethacrylate was similarly catalyzed using, as an example of anionic catalyst, fluorenyl lithium, and t-butyl hydroperoxide. Brittle fibres were obtained.

EXAMPLE 9

Polyurethane polymers which were waxy or solid at room temperature but which had a sufficient degree of polymerization to enable them to be fibrillated in the melt were end-capped with hydroxyethyl methacrylate. The material so obtained was U.V. cured between glass plate.

Diol formulation [1]:

| | |
|---|---|
| PPG (MW 425) | Brittle fibres |
| DEG adipate (225) | Do. |
| OPTDA (710) | Do. |
| OE/OP glycerol/TDA (430) | Tough fibres |
| PPG (425)/PPG (1025) (1:1) | Flexible fibres |
| PPG (425)/PPG (1025) glycerol (1:1:0:05) | Tough fibres |
| As above+10% styrene | Do. |

[1] End capped with MDI followed by HEM benzoin U.V. catalyst added and product cured in U.V.

When epoxy resins are used as the polymeric material in the process of the invention the uncured epoxy resin preferably should have between 2.0 and 0.2 gram-equivalents of epoxide groups per kilogram of resin.

Epoxy resins are well known commercial materials, many of which are based on the reaction products of bisphenol "A" with epichlorohydrin, which have the general formula

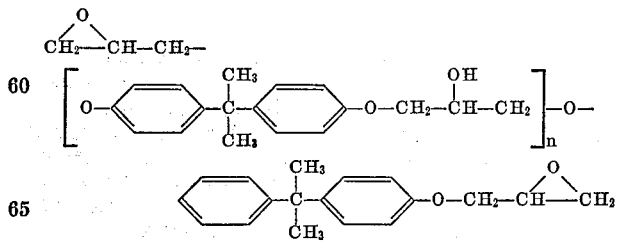

where $n$ is an integer. Assuming no branching occurs, each molecule will have two epoxy groups and $n$ secondary aliphatic hydroxyl groups. Where $n=0$, the molecular weight is 340, and 1 kg. of resin contains 1000/170=5.9 gram equivalents of epoxide groups. As $n$ increases, the number of equivalents of epoxide groups per kilogram of resin decreases, and the viscosity and softening point of the resin increase.

The epoxy resins may be cured by several methods for example either by use of a catalyst such as boron trifluoride or its amine complexes for the homopolymerization of epoxide groups or by use of a crosslinking agent such as a polyfunctional primary or secondary amine or an acid anhydride which is capable of reacting with more than one epoxide group. Epoxy resins based on di and poly-phenols other than bisphenol "A" are generally similar and may be cured in similar ways. These catalysts, polyamines, anhydrides etc. are commonly termed "hardeners."

The simple test described previously may be used to determine whether a particular resin/hardener system is suitable for use in the process of that application, and to determine approximately optimum processing conditions. Epoxy resins having between 2.0 and 0.2 gram equivalents of epoxide groups per kilogram of resin are relatively high molecular weight resins which may well be highly viscous or even solid at room temperature. Advantageously such resins may be used in a solvent inert towards epoxide groups and the hardener used, for example methylene chloride or toluene. The boiling point of the solvent chosen is preferably lower than the curing temperature to be used, so that removal of solvent by volatilisation occurs during curing and drawing of fibres. The concentration of resin in the solution is preferably not less than 50% by weight.

As the cure of the epoxy resin progresses, it passes successively through a stage in which its viscosity increases, but in which fibres cannot be drawn, a stage in which fibres can be drawn, and a stage in which the resin is gelled, and drawing of fibres is not possible but fibres already drawn become stable.

It is desirable that the overall cure time should be short so as to allow high rates of production, that the duration of the first stage should be long enough to allow complete mixing of resin and hardener, and that the second stage should not be so narrow in range that minor variations in conditions could produce large variations in the product. Variables controlling these factors include the nature and concentration of hardener, the concentration of solvent present and the temperature of temperatures to which the resin is subjected during the process.

The hardener employed is preferably an aliphatic amine, as aromatic amines and anhydrides give longer cure times. Another type of preferred hardener is boron trifluoride/amine complexes. Boron trifluoride etherate may be used, but is liable to be too reactive in some resin systems.

Preferably the resin hardeners are mixed at ambient temperature before application to the foundation sheet and subsequently heated preferably to between 80° C. and 160° C. After a certain time at this temperature, fibres may be drawn from the resin, and after a further time, the fibres become hardened and will not collapse into the bulk of the resin.

This aspect of the invention is illustrated by the following examples.

EXAMPLE 10

20 g. "Epikote 1009," an epoxy resin having 0.31 gram equivalents of epoxide groups/kg., was mixed with 10 cm.$^3$ methylene chloride and 0.12 g. "Araldite" HY 951 hardener (triethylene tetramine). Portions were sandwiched between two glass microscope slides heated at 120° C. After 25 seconds, good fibres could be drawn on separation of the plates, and after 130 seconds the resin set and no fibres could be drawn. When the plates were heated to 160° C., fibres could be drawn between 10 seconds and 90 seconds from the time of contact of the resin with the hot plates. Longer and fewer fibres were obtained than when the temperature was 120° C.

"Epikote" is a registered trademark of Shell Chemical Co. Ltd.

"Araldite" is a registered trademark of Ciba Ltd.

EXAMPLE 11

"Epikote 1009" (30 parts) and "Epikure RTV" (registered trademark of Shell Chemical Co. Ltd.) (1.1 parts), and sandwiched between two glass plates heated to 120° C. After 20 seconds, a large number of fibres ~1 cm. long were formed when the plates were separated. Increasing the time of heating to 65 seconds gave progressively shorter fibres on drawing.

EXAMPLE 12

"Epikote 1007," an epoxy resin having 0.51 gm. equivalents of epoxide groups/kg. (40 parts), chloroform (30 parts) and a 5% solution of boron trifluoride etherate in methylene chloride (1 part), were mixed together and applied to glass plates. At 100° C., fibres could be drawn from 15 to 75 seconds from contact with the hot plates, giving long fibrils. At 160° C., cure was too rapid for fibres to be drawn.

EXAMPLE 13

"Epikote 1007" (20 parts), methylene chloride (20 parts) and "Araldite HY 951" (0.2 parts) were mixed together and applied to glass plates as before. At 120° C., with a contact time of 30 seconds, very long fibres could be drawn. At 80° C., 30 seconds, the fibres were shorter and more closely spaced.

EXAMPLE 14

"Epikote 1001," an epoxy resin having 2.2 gm. equivalents of epoxide groups/kg. (30 parts), methylene chloride (30 parts) and "Epikure RTV" (7.5 parts) were mixed and applied to glass plates as before. No fibres could be drawn at temperatures between 100 and 160° C. and with contact times up to 5 minutes.

EXAMPLE 15

A mixture of "Epikote 1009" (20 parts), methylene chloride (20 parts) and "Araldite HY 951" (0.24 parts) was applied to a continuous 9 cm. wide strip of lightweight absorbent unglazed paper (19 gm.$^{-2}$) by means of a doctor blade, at the rate of 110 g. resin/m.$^2$. A second strip of the same paper was applied to the resin-coated surface of the first strip, and the resulting laminate was passed over a plate heated to 130° C., with a residence time on the plate of 10–15 sec., and then through the nip of a pair of rollers maintained at 100° C.

The strips of paper were separated from each other at a distance of approximately 20 cm. from the rollers. Fibres were drawn between the strips, and broken to give two pile-surfaced strips. Increasing the pressure in the nip of the rollers gave shorter fibres more closely spaced together.

EXAMPLE 16

"Epikote 1004," an epoxy resin having 1.1 gram equivalent of epoxide groups/kg. (20 parts), methylene chloride (20 parts) and "Araldite HY 951" (1 part) were mixed and applied to paper strips as in Example 15. The laminate was passed over a heated plate at 90° C. with a residence time of 10–20 sec. then through the nip of a pair of rollers at 140° C. Fibrous pile surfaced strips were obtained on pulling the strips apart. By varying the pressure between the rolls and the residence time, fibre lengths between 1 and 5 mm. were obtained.

Applications for the products of our process may include, for example, floor and ground coverings, e.g. in the place of carpets, for swimming pool surrounds, deck coverings for boats, indoor and outdoor running tracks, bowling greens, ski and toboggan slopes, mats, bathmats, bowling mats and curling mats; upholstery, e.g. for vehicles, deck chairs, garden furniture, loose covers, cushion covers and antimacassars; linings, e.g. for outer cold-weather garments, suitcases, cat and dog baskets, cutlery drawers, jewel cases and coffins; wall and ceiling coverings, card table tops; ornamental textured surfaces, e.g. for garments, millinery, footwear, shopping bags, handbags, sporrans, academic, clerical and civic regalia and stage scenery and costumes; simulated fur; sound-adsorbent articles, e.g. as buffers for lids and doors and as mats for typewriters, sewing machines, calculating machines, washing machines and dishwashers; conveyor belting, especially for retaining cylindrical or spherical objects; artificial surfaces for aquaria; supports for organisms in biochemical processes e.g. in water treatment; oyster beds; ski skins; polishing mats; filter media; towelling and paint stippling pads packaging materials.

What I claim is:

1. A method of preparing pile surfaced products which comprises contacting with a surface to which it adheres a curable epoxy resin of which the uncured state has between 2.0 and 0.2 gram equivalents of epoxide groups per kilogram of resin, separating the resin from the surface at a point at which it is capable of fibrillation, so that fibres are formed in the resin, effecting cure of the fibres to stabilise them, and detaching the resin and its adherent fibres from the said surface.

2. A method according to claim 1 in which the resin is interposed between the surface and a support layer to which it bonds on curing.

3. A method according to claim 1 in which the resin is interposed between two surfaces and after fibre formation the pile surfaced product is cured at least to the patent that it is coherent and is separated from the surface to which it adhered during fibre formation.

4. A method according to claim 1 in which the curable resin is a partly cured polymeric material.

5. A method according to claim 2, in which the support layer is a porous or perforated sheet.

6. A method according to claim 1 in which after foundation of the pile-surface the curable material is subjected to a further curing step.

7. A method according to claim 1 in which the curable resin is held in contact with the surface, at least in the region in which fibre foundation occurs, by resillient means.

8. A method of preparing pile surfaced products which comprises interposing a curable epoxy resin of which the uncured state has been 2.0 and 0.2 gram equivalents of epoxide groups per kilogram of resin between two support layers to which the resin adheres, separating the support layers one from the other in a direction perpendicular to the plane of the said layers at a point such that fibres are formed in the curable resin, effecting cure of the fibres to stabilise them, separating the support layers further so that a pile surfaced product is obtained on each layer, and detaching the resin from the surface layer at a point at which the degree of cure is such that disintegration of the sheet product does not occur.

References Cited

UNITED STATES PATENTS

| | | | |
|---|---|---|---|
| 3,696,183 | 10/1972 | Steel et al. | 264—164 |
| 3,450,585 | 6/1969 | Takagi et al. | 156—242 |
| 3,708,565 | 1/1973 | Suffert | 264—88 |
| 3,174,889 | 3/1965 | Anderson et al. | 156—254 |

DOUGLAS J. DRUMMOND, Primary Examiner

U.S. Cl. X.R.

156—72, 167; 264—284